April 11, 1967   R. L. WILLIAMSON ETAL   3,314,045
ECHO SOUNDERS

Filed Nov. 30, 1964   4 Sheets-Sheet 1

United States Patent Office 3,314,045
Patented Apr. 11, 1967

3,314,045
ECHO SOUNDERS
Robert Lawton Williamson, Ilford, and John Henry Lindars, Chelmsford, England, assignors to Plessey-UK Limited, Ilford, England, a British company
Filed Nov. 30, 1964, Ser. No. 414,795
Claims priority, application Great Britain, Nov. 29, 1963, 47,171/63
15 Claims. (Cl. 340—3)

This invention relates to echo sounders and particularly to echo sounder receiving systems.

In normal echo sounder receiving systems the echo of a transmitted pulse is made to light a moving lamp or mark paper through a moving stylus, the distance between the flash or mark caused by the transmitter itself and that caused by the echo being a measure of the depth from which the echo is received.

Owing to the changing nature of the bottom, aeration of the water by the ship etc., there is considerable variation in signal strengths of echoes even between successive transmissions. Furthermore such phenomena as re-echoes and shoals of fish can give spurious indications. Generally speaking an experienced operator can distinguish the actual bottom echo from spurious indication, particularly in the use of a paper recorder.

In preferred automatic systems the problem of identifying the bottom echo from other indications is difficult. It has been found that the only satisfactory system is one which detects the strongest echo after each transmission whatever the relative echo strengths, following other transmissions.

A known receiver system employs an amplifier having six outputs whose gains increase successively by 10 decibels. Each output triggers a flip-flop which, once operated, remains in the triggered state until re-set at the start of the next sounding cycle i.e. at the time of the next transmitted acoustic pulse. If, then, a certain echo causes the two most sensitive flip-flops to be triggered, no further triggering can take place until a stronger echo occurs to trigger the next flip-flop. Since the bottom echo is the strongest, no echoes coming after it in the same sounding cycle can operate further flip-flops. Operation of a flip-flop produces a pulse, so that following each transmission one or more pulses are produced, of which the last corresponds to the bottom echo. The disadvantage of this known system is that only echoes of more than 10 decibels strength greater than preceding echoes are received into the system. Hence if an echo of 8 decibels less than the required bottom echo was received into the system the bottom echo would be missed.

It is therefore an object of the present invention to provide an echo sounder receiving system which will register all echoes greater than preceding received echoes during each sounding cycle.

According to the present invention we provide an echo sounder receiving system comprising a receiving transducer connected via an amplifier, the gain of which increases over a predetermined range during each sounding cycle in use, to a comparison unit, the comparison unit being such that during each sounding cycle an electrical output pulse is produced upon reception of the first significant amplified electrical echo-representing signal and a further electrical output pulse is produced upon reception of each succeeding amplified electrical echo-representing signal which is greater than all the preceding amplified electrical echo-representing signals.

The comparison unit may include a threshold unit connected so as to receive each amplified electrical echo-representing signal, the threshold unit being arranged to produce an output signal for each input signal which is of greater value than a control signal applied to the threshold unit, the output signal from the threshold unit being utilised to initiate the comparison unit output pulse and to increase the value of the control signal to a value equal to the value of the input signal to the threshold unit.

The output from the threshold unit may be connected to a first bistable circuit which is connected via a delay arrangement to a second bistable circuit, both bistable circuits being connected to an AND gate, the arrangement being such that the two bistable circuits are normally in the reset condition, an output from the threshold unit causing the first bistable circuit to be changed to its set condition, the resulting output being fed to the AND gate coincident with the reset output from the second bistable circuit to initiate an output pulse from the AND circuit and the said resulting output also being fed via the delay arrangement to change the second bistable circuit to its set condition so cutting off its reset output to the AND gate and terminating the output pulse from the AND gate.

The second bistable unit may be connected via an integrator circuit to the threshold unit, the arrangement being such that the output from the second bistable circuit when in its set condition is fed via the integrator circuit to provide the control voltage to the threshold unit.

An amplification and rectification unit may be connected between the threshold unit and the first bistable circuit.

The output from the amplification and rectification unit may be connected to the input of an inverting amplifier whose output is connected to the two bistable circuits so as to change them to their reset conditions at the end of an output signal from the amplification and rectification unit.

The AND gate output may be connected to the input of a voltmeter type display system or alternatively may be connected to the input of a digital display system.

In order that the invention can be more clearly understood a specific embodiment thereof will hereinafter be described, by way of example only, with reference to the accompanying drawings, in which.

Figure 1:
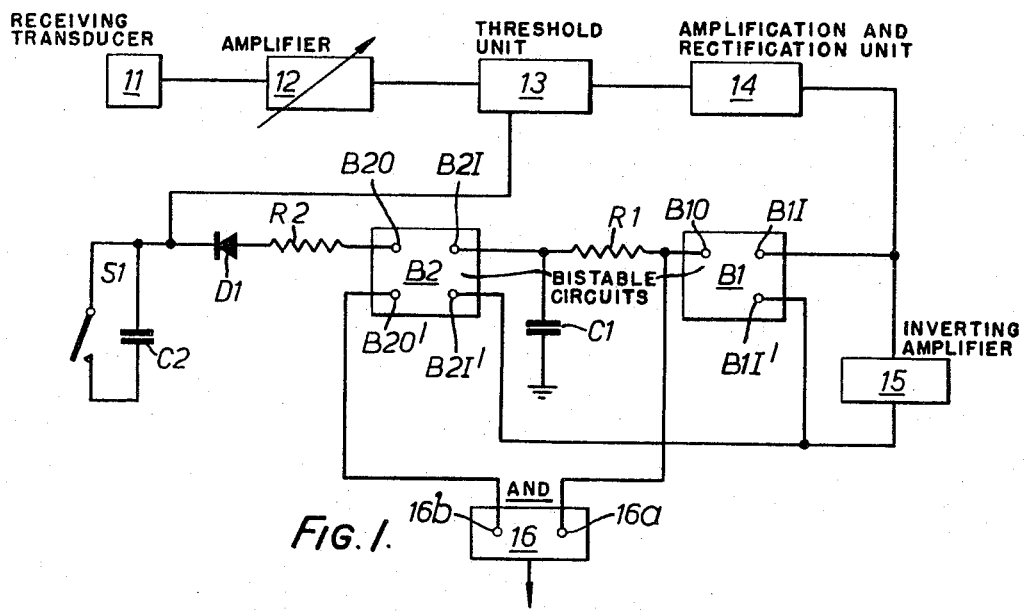
FIGURE 1 shows a block schematic representation of part of an echo sounder receiving system.

Referring firstly to FIGURE 1 there is shown part of an echo sounder receiving system comprising a receiving transducer 11 connected to an amplifier 12, the gain of which increases over a predetermined range during each sounding cycle. By this arrangement initial echoes from relatively low depth obstacles (e.g. shoals of fish) will not be amplified very much and the resulting signal may not even be large enough to produce an output from a comparison unit. The amplifier 12 is connected to the comparison unit comprising a threshold unit 13, an amplification and rectification unit 14, an inverting amplifier 15, two bistable circuits B1 and B2 and an AND gate 16.

Figure 2:
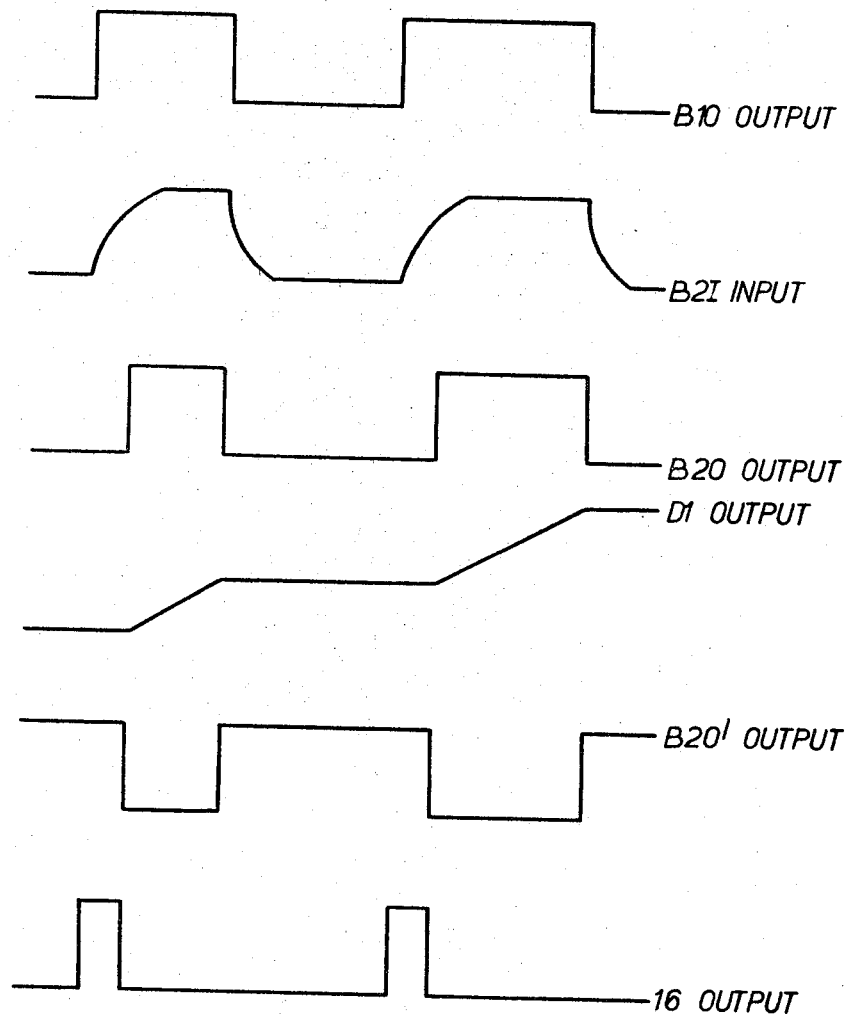
FIGURE 2 shows a number of waveforms occurring at points of the circuit of FIGURE 1.

Referring now to FIGURES 1 and 2 the receiving system of FIGURE 1 will now be described in greater detail whilst considering its mode of operation.

An acoustic impulse is transmitted by the echo sounder transmitter (not shown) and acoustic echoes are received by the receiving transducer 11 which produces corresponding electrical alternating current pulses, these pulses being passed to amplifier 12. The pulses are amplified at amplifier 12 by a varying degree dependent upon when in the sounding cycle they occur, the amount of amplification increasing during the sounding cycle.

Each amplified pulse is passed to threshold unit 13. The amplitudes of the initial pulses are compared with an initial threshold amplitude and are ignored if they do not exceed the threshold amplitude, so ensuring that small spurious pulses are not indicated by the system.

On the occurrence of the first pulse with an amplitude greater than the threshold amplitude an output signal is passed to amplification and rectification unit 14. The corresponding amplified and rectified output signal from unit 14 is fed to input terminal B1I of bistable circuit B1.

Both bistable circuits B1 and B2 are normally in their reset condition. The input signal to input terminal B1I causes bistable circuit B1 to change to its set condition so producing an output from output terminal B10. The output from terminal B10 is fed to input terminal 16a of AND gate 16 to initiate an output pulse from the AND gate, input terminal 16b already being fed from output terminal B20' of bistable circuit B2 in its reset condition. The output from terminal B10 is also fed via a delay arrangement comprising a resistor R1 and a capacitor C1 to input terminal B2I of bistable circuit B2 to change bistable circuit B2 to its set condition.

Bistable circuit B2 changing to its set condition causes the output from output terminal B20' to input terminal 16b of AND gate to cease, so terminating the output pulse from AND gate 16. An output from output terminal B20 of bistable circuit B2 is now initiated which is passed to an integrator circuit comprising a resistor R2, a diode D1 and a capacitor C2, switch S1 being closed at the beginning of the sounding cycle to discharge capacitor C2 and then being opened again.

The output from the junction of diode D1 and capacitor C2 gradually increases in amplitude and is fed as a control signal to threshold unit 13 to increase the threshold amplitude. When the threshold amplitude reaches the amplitude of the input pulse from amplifier 12 the output from threshold unit 13 is terminated.

The trailing edge of the output signal from unit 14 is amplified and inverted by inverting amplifier 15 and fed to input terminals B1I' and B2I' of respective bistable circuits B1 and B2 to return them to their reset condition. The outputs from output terminals B10 and B20 are now terminated, the control signal to threshold unit 13 being maintained at its acquired level by diode D1.

Further input pulses to threshold unit 13 are ignored unless their amplitudes exceed the new threshold amplitude set by the amplitude of the preceding pulse. When the next pulse with an amplitude greater than the new threshold amplitude is fed to unit 13 from amplifier 12 the process described above is repeated, the threshold amplitude being increased still further.

This procedure continues until the sounding cycle is almost complete and as it is known that the bottom echo must be the largest the last pulse from AND gate 16 must be due to the bottom echo.

Referring specifically to FIGURE 2 a number of waveforms are shown which occur at points (as referenced) in the circuit of FIGURE 1 during a sounding cycle in which two pulses from amplifier unit 12 have amplitudes which exceed the threshold amplitudes. It will be noted that the duration of the pulses from terminal B10 vary in length, this length being dependent upon the amount that the amplitude of the input pulse from amplifier 12 is greater than the threshold amplitude. It will also be noted that the duration of the output from AND gate 16 is constant, this duration being dependent upon the time delay of the delay arrangement R1, C1.

Figure 3:
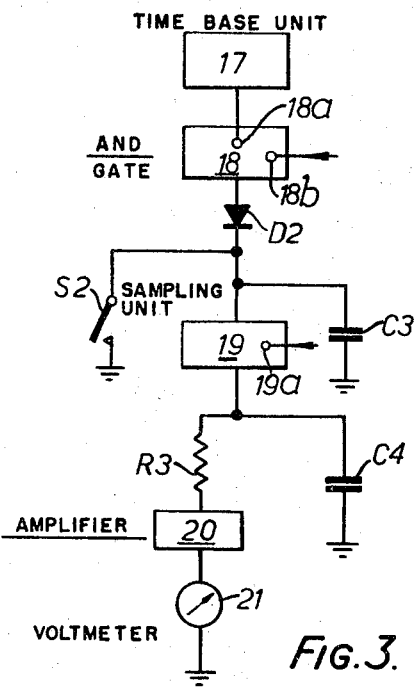
FIGURE 3 shows a block schematic representation of a voltmeter display system for use with the system of FIGURE 1.

Referring now to FIGURE 3 there is shown a voltmeter type display system for use with the circuit of FIGURE 1.

The voltmeter display system comprises a time base unit 17 producing a time base output, increasing exponentially, and triggered in accordance with the transmitted pulse repetition frequency by a signal which may conveniently be obtained from the echo sounder transmitter (not shown) and the time base output is fed to input terminal 18a of an AND gate 18. Input terminal 18b of AND gate 18 is connected to the output terminal of AND gate 16 (FIGURE 1). The outputs from AND gate 18 vary in amplitude dependent upon the time of their occurrence which is dependent upon the occurrence of output pulses from AND gate 16 and hence on depth from which echo is produced.

The output from AND gate 18 is fed via a diode D2 to charge a capacitor C3, capacitor C3 being discharged at the beginning of each sounding cycle by closing switch S2 and then re-opening.

The voltage across capacitor C3 is sampled by a sampling unit 19 near the end of the sounding cycle upon the occurrence of a sampling pulse which may conveniently be derived by suitably delaying a signal at the transmitter pulse repetition frequency obtained from the echo sounder transmitter (not shown) and applied to input terminal 19a of sampling unit 19.

The output from sampling unit 19 is fed via a resistor (R3) and capacitor (C4) arrangement, having a time constant which is much greater than the time between sounding, and via an amplifier 20, having a very high input impedance to a voltmeter 21 which is calibrated to give a direct reading of depth.

Figure 4:
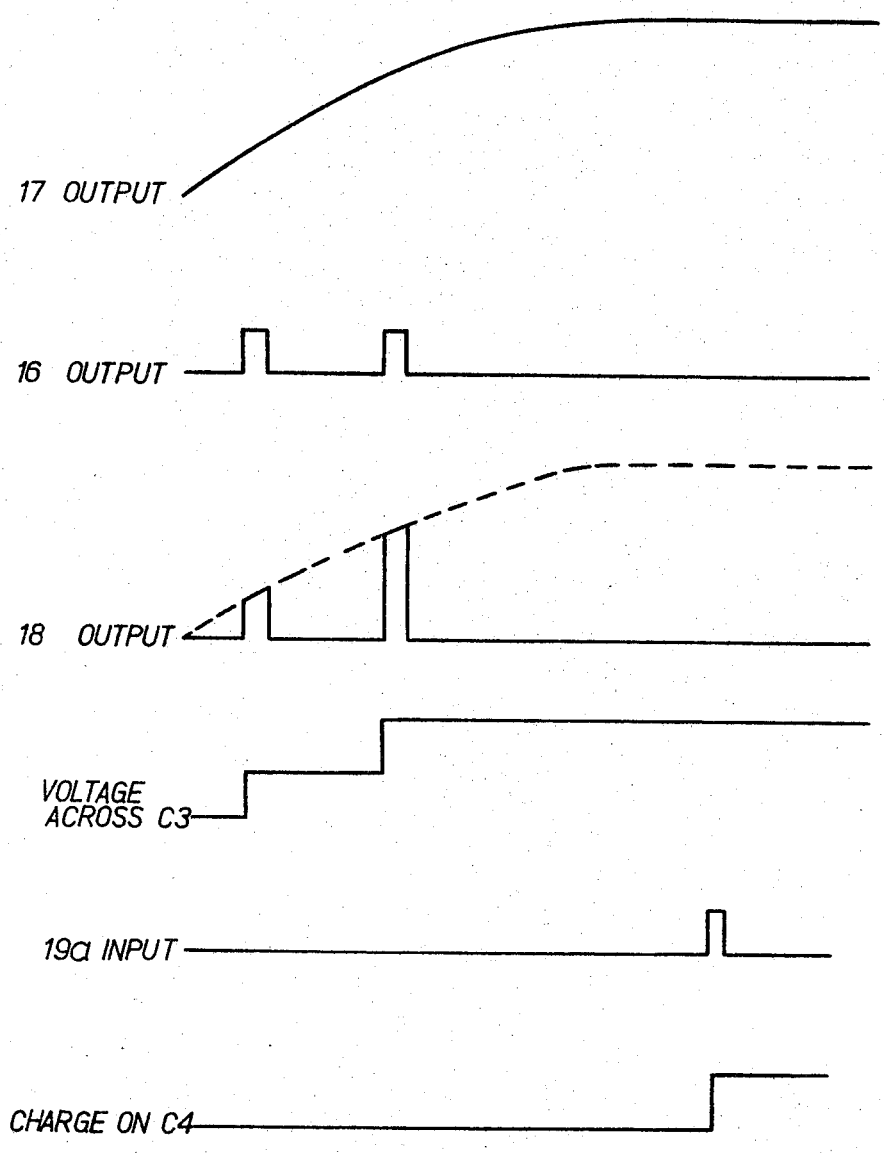
FIGURE 4 shows a number of waveforms occurring at points of the circuit of FIGURE 3.

Referring now to FIGURE 4 a number of waveforms are shown which occur at points (as referenced) in the circuit of FIGURE 3 during the same sounding cycle as illustrated in FIGURE 2.

Figure 5:
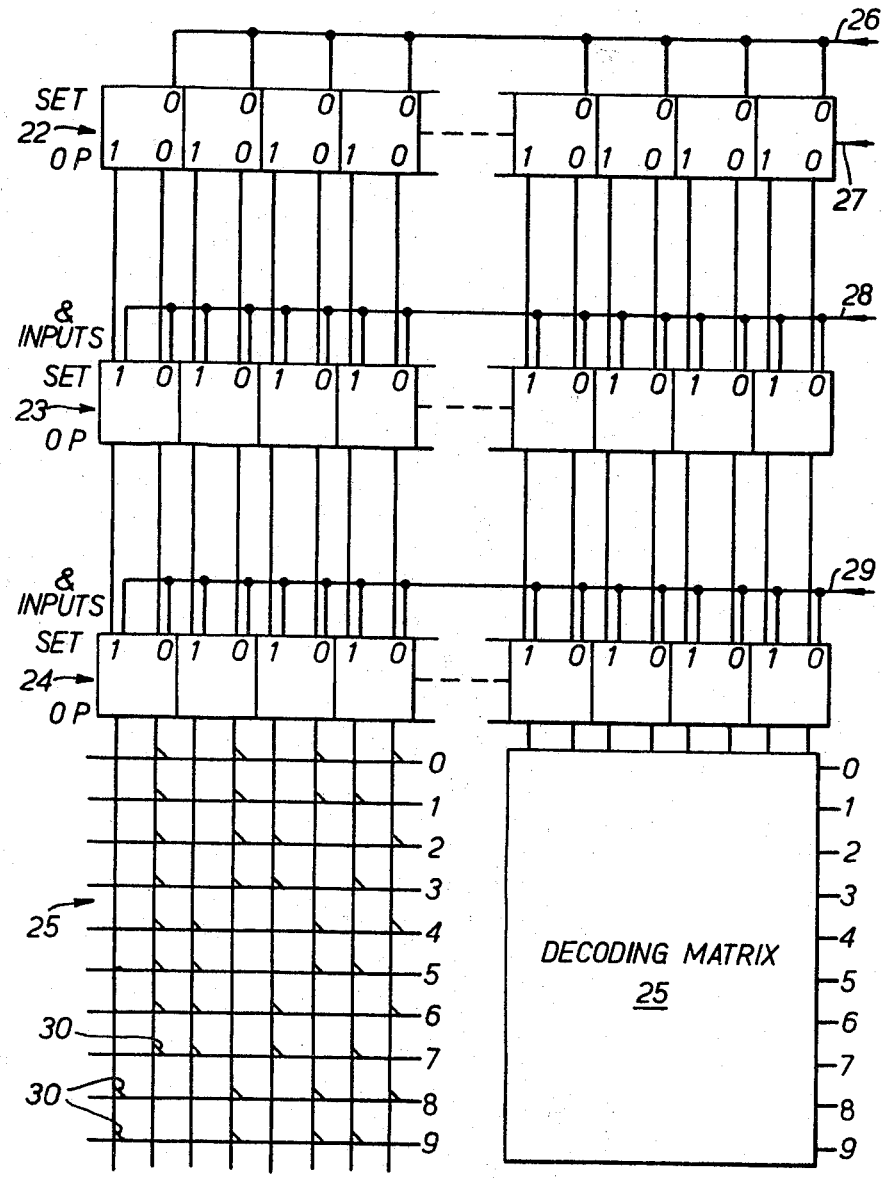
FIGURE 5 shows a block schematic representation of a digital display system for use with the system of FIGURE 1.

Referring now to FIGURE 5 there is shown a digital display system for use with FIGURE 1 as an alternative to the voltmeter display system of FIGURE 3.

The digital display system comprises a binary coded decimal counter 22 (2 digits only being shown), an intermediate register 23, a display register 24 and a decoding matrix 25 for each digit.

The counter 22 comprises four bistable circuits for each digit, and is reset to zero at the beginning of each sounding cycle by a reset pulse on line 26. The counter is caused by to count by input pulses on line 27, the frequency of occurrence of the pulses being determined by the range and units employed by the echo sounder.

The outputs from the counter 22 are passed to the intermediate register 23, also comprised of four bistable circuits for each digit, which records these outputs when coincident with an output from gate 16 (FIGURE 1) on line 28, the intermediate register being reset to zero by an input pulse on line 28 at the beginning of each sounding cycle.

The outputs from the intermediate register 23, also comprised of four bistable circuits for each digit, are fed to the display register 24 which accepts these outputs when coincident with an input pulse on line 29 at or near the end of the sounding cycle.

The outputs from the display register 24, which contains a record of the required depth in binary form, are fed to a respective binary to decimal decoding matrix 25 for each digit.

The intersections of the rows and columns of the decoding matrix 25 which are joined with a line 30 are the intersections provided with a diode connection. The outputs referenced 0 to 9 of the decoding matrices 25 are fed to a digital display apparatus (not shown) to display the required bottom depth.

It will be appreciated that the specific circuitry employed for the threshold and other units of the system according to the invention may take many different forms which can be devised by using standard techniques.

What we claim is:

1. An echo sounder receiving system comprising a receiving transducer, an amplifier connected to said transducer, said amplifier having a gain which increases over a predetermined range during each sounding cycle, a comparison unit connected to said amplifier and operative during each sounding cycle to produce an electrical output pulse upon reception of the first significant amplified electrical echo-representing signal and a further electrical output pulse upon reception of each succeeding amplified electrical echo-representing signal which is greater than all the preceding amplified electrical echo-representing signals.

2. An echo sounder receiving system as claimed in claim 1, in which the comparison unit includes a threshold unit connected so as to receive each amplified electrical echo-representing signal and arranged to produce an output signal for each input signal which has a magnitude of greater value than a control signal applied to the threshold unit, with the output signal from the threshold unit being utilised to initiate the comparison output pulse for increasing the value of the control signal applied to it to a value equal to the value of the input signal to the threshold unit.

3. An echo sounder receiving system as claimed in claim 2 including first and second bistable circuits, a delay circuit interconnecting said first and second bistable circuits, said threshold unit being connected to said first bistable circuit, an "AND" gate connected to both of said bistable circuits, the arrangement being such that the two bistable circuits are normally in the reset condition, an output from the threshold unit causing the condition of the first bistable circuit to be changed to the set condition with the resulting output being fed to the "AND" gate coincident with the reset output from the second bistable circuit so as to initiate an output pulse from the "AND" gate and the said resulting output being fed also via said delay circuit to change the condition of the second bistable circuit after a predetermined time delay to the set condition thereby cutting off its reset output to the "AND" gate to terminate the output pulse from said gate.

4. An echo sounder receiving system as claimed in claim 3, including an integrator circuit connecting said second bistable unit to the threshold unit, so that the output from the second bistable circuit when in its set condition is fed to the integrator circuit which provides the control voltage for the threshold unit.

5. An echo sounder receiving system as claimed in claim 3 including an amplification and rectification unit connected between the threshold unit and the first bistable circuit.

6. An echo sounder receiving system as claimed in claim 5, including an inverting amplifier having its input connected to said amplification and rectification unit and its output connected to the two bistable circuits for resetting these circuits upon the termination of an output signal from the amplification and rectification unit.

7. An echo sounder receiving system as claimed in claim 6, including a voltmeter display system having its input connected to said "AND" gate.

8. An echo sounder receiving system as claimed in claim 7, in which the voltmeter display system includes a time base unit producing an output which increases exponentially with time and which is applied to one of the inputs of a further "AND" gate having its other input connected to the output of the first-mentioned "AND" gate so that the outputs from the further "AND" gate vary in amplitude dependent upon the time of their occurrence which is dependent upon the occurrence of output pulses derived from the said first-mentioned "AND" gate.

9. An echo sounder receiving system as claimed in claim 8, including a capacitor and diode integrator circuit, and a sampling unit, in which the outputs from the further "AND" gate charge said capacitor through said diode, said capacitor being arranged to be discharged at the beginning of each sounding cycle and the voltage across the capacitor being sampled by said sampling unit towards the end of each sounding cycle upon the application of a sampling pulse to the input of said sampling unit.

10. An echo sounder receiving system as claimed in claim 9, including a capacitor and resistor feed circuit arrangement having a time constant which is much greater than the sounding cycle, and a sampling amplifier, said voltmeter display system comprising a voltmeter calibrated to give a direct reading of depth, said capacitor and resistor feed circuit feeding said sampling unit and connecting the sampling unit via said sampling amplifier to said voltmeter.

11. An echo sounder receiving system as claimed in claim 6, including a digital display system having its input connected to said "AND" gate output.

12. An echo sounder receiving system as claimed in claim 11, in which the digital display system comprises a binary coded decimal counter, an intermediate register, a display register and a binary to decimal decoding matrix in respect of each digit.

13. An echo sounder receiving system as claimed in claim 12, in which outputs from the binary counter are passed to the intermediate register when coincident with an output from the "AND" gate.

14. An echo sounder receiving system as claimed in claim 13, in which the display register accepts outputs from the intermediate register when the outputs are coincident with an output pulse applied to it at or near the end of the sounding cycle.

15. An echo sounder receiving system as claimed in claim 14, in which the display register which records the requisite depth in binary form feeds outputs to the binary to decimal decoding matrix for each stored digit.

References Cited by the Examiner

UNITED STATES PATENTS

| | | | |
|---|---|---|---|
| 3,145,363 | 8/1964 | Haslett | 340—3 |
| 3,209,256 | 9/1965 | Slawsky | 324—103 |
| 3,214,754 | 10/1965 | Hilderbradt | 343—5 |

OTHER REFERENCES

Jones, "The Metron Depth Sounder," Industrial Electronics, vol. 1, No. 4, January 1963, pp. 191–194 relied on.

CHESTER L. JUSTUS, *Primary Examiner.*

RODNEY D. BENNETT, *Examiner.*

R. A. FARLEY, *Assistant Examiner.*